3,231,783
SPECTROPHOTOMETER POWER SUPPLY

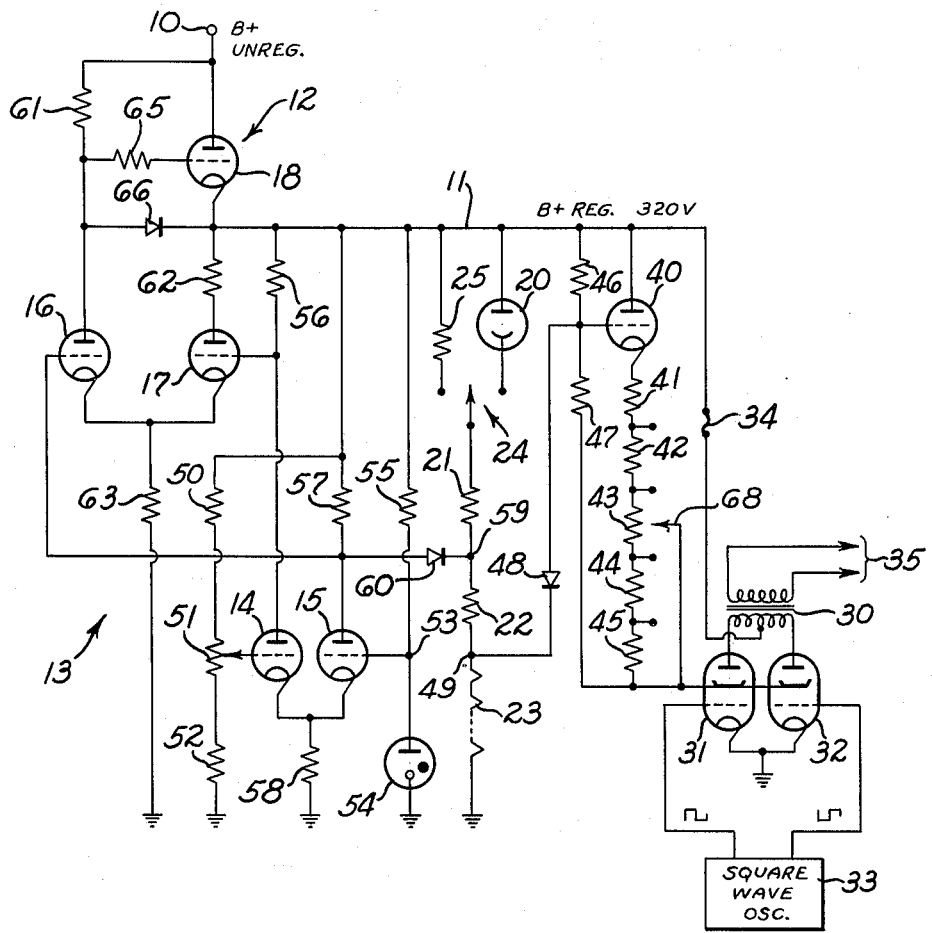

Attila D. Boronkay, Fullerton, and Jerrold H. Randall, Corona del Mar, Calif., assignors to Beckman Instruments, Inc., a corporation of California
Filed Dec. 5, 1962, Ser. No. 242,485
12 Claims. (Cl. 315—297)

Our invention relates to power supplies, and more particularly, to a regulated power supply suitable for use with a light source lamp in conjunction with spectrophotometers and other electrical equipment.

Prior power supplies providing a regulated voltage for light source lamps have failed to provide a means for preventing a current overload upon failure or malfunction of the light source lamp and have failed to provide a suitable firing circuit for such light source lamps thereby shortening the lifetime thereof. Accordingly, it is an object of the invention to provide a means for interrupting the current flow upon failure of the light source lamp and thus avoid a current overload. It is also an object of the invention to provide a suitable firing circuit for a light source lamp so as to materially increase the lifetime of such light source lamp.

It is another object of the invention to provide a regulated power supply for operating a light source lamp of the type employed in a spectrophotometer whereby the light source lamp is provided with an increased voltage at the moment of firing. Another object of the invention is to provide a regulated power supply for a light source lamp of the type employed in a spectrophotometer whereby the regulated voltage in the electrical circuit is returned to its original level immediately after the light source lamp has been fired.

It is a further object of the invention to provide a regulated power supply for a light source lamp of the type employed in a spectrophotometer in which the electrical circuit would be protected from damage resulting from excessive current flow in the event of malfunction of such light source lamp.

Another object of the invention is to provide a regulated power supply for a first load comprising a gas discharge lamp, e.g., a hydrogen lamp, and a second load, in which a control circuit is provided for increasing the voltage at the moment of firing such lamp, for stabilizing the voltage at the level achieved before firing such lamp, and for protecting the circuit from damage resulting from excessive current flow to said second load in the event of malfunction of the hydrogen lamp.

It is a further object of the invention to provide a regulated spectrophotometer power supply including an unregulated power source, an amplifier unit, a regulator unit, first and second loads, a circuit means for interconnecting the power source, the amplifier unit and the regulator unit for providing a regulated D.C. output voltage across said first and second loads, a control means for applying a substantially constant current to said second load from said regulated output voltage, and a control circuit connected between the first load and the control means providing a means for interrupting the current supply from the control means to the second load in the event there is a malfunction or failure of the first load.

Still another object of the invention is to provide a regulated spectrophotometer power supply including an unregulated power source, a phase inverter, an amplifier unit, a regulator unit, a first load including a lamp for the spectrophotometer, a means for turning the lamp on and off, a second load including a means for providing an ultimate regulated A.C. output to the spectrophotometer, a circuit means interconnecting the power source, the phase inverter, the amplifier unit, and the regulator unit to provide a regulated D.C. voltage across the first and second loads, and a control circuit connected between the first and second loads, the amplifier unit, and the regulator unit providing a first circuit means connecting the lamp to the amplifier unit including a means for shutting down the effect of the amplifier unit and for raising the instantaneous voltage through the regulator unit at the moment of firing the lamp, a second circuit means connecting the amplifier unit to the regulator unit including a means for preventing the regulator unit from drawing excessive current during the firing of the lamp, and a third circuit means connecting the second load to the regulator unit including a control means for the second load having a control element therewithin, and a diode connected to the control element of the first load.

The invention also comprises novel details of construction and novel combinations and arrangements of parts, which will more fully appear in the course of the following description. The drawing shows a circuit diagram of a preferred embodiment of the present invention which is given by way of illustration or example.

The apparatus of the invention as illustrated herein comprises a regulated D.C. power supply with the unregulated D.C. power supplied through the terminal 10.

The regulated D.C. power supply provides a D.C. voltage across an output load and includes means for detecting changes in the magnitude of the D.C. voltage and control elements for maintaining this voltage substantially constant during variations in the output load or the input voltage. The unregulated voltage from a power source is connected at terminal 10 and the regulated voltage is maintained on a line 11.

The apparatus includes a regulator unit 12 which directly controls the voltage on the line 11, and an amplifier unit 13 which controls the regulator unit. The amplifier unit includes a pair of triodes 14, 15 operated as a phase inverter and another pair of triodes 16, 17 operated as an amplifier stage. The regulator unit 12 is shown as including a single triode 18 but of course a plurality of such tubes may be operated in parallel to provide the desired load capability. It should be noted that while triode and tetrode vacuum tubes have been illustrated throughout the circuit, comparable control elements including transistors may be utilized.

In the preferred embodiment illustrated herein, the output load includes a first load comprising a hydrogen gas discharge lamp 20, resistors 21, 22 and a string 23 of heaters for the tubes. A switch 24 provides for selectively connecting the lamp 20 or an equivalent resistor 25 in the load circuit.

In the preferred embodiment, the output load also includes a second load comprising an output transformer 30, a pair of tetrodes 31, 32, and a square wave oscillator 33 for driving the tetrodes, with the center tap of the transformer primary connected to the line 11 through a fuse 34. This second load provides a stable A.C. supply for the spectrophotometer at the lines 35. The hydrogen lamp 20 functions as a light source for the spectrophotometer.

A substantially constant current for the screen grids of the tetrodes 31, 32 is provided through a cathode follower stage comprising a triode 40 and a tapped string of cathode resistors 41, 42, 43, 44, 45, the resistance here being subject to further control by a variable switch 68 for selctively connecting such desired cathode resistors to the screen grids of the tetrodes. A voltage divider comprising resistors 46, 47 provides a control voltage at the grid of the triode 40. A control elment in the form of a unidirectional conductor such as a crystal diode 48 is connected between the grid of the triode 40 and the first load, preferably at the point 49. The function of this control element will be described hereinbelow.

The amplifier unit 13 and the regulator unit 12 function as a conventional regulated power supply with the control signal being provided by a voltage divider including a resistor 50, a potentiometer 51 and a resistor 52 with the arm of the potentiometer 51 connected to the control grid of the tube 14. The control grid of the tube 15 is connected to a reference point 53 provided by a voltage regulator tube 54 and a resistor 55. It should be noted here that any other suitable means such as a battery could be used to establish the reference voltage at the point 53. Resistors 56, 57 serve as plate load resistors for the tubes 14, 15 respectively, while the cathodes are connected together and to circuit ground through a resistor 58.

The plate signal from the tube 14 is connected directly to the control grid of the tube 17 and the control grid of the tube 16 is connected to the plate of tube 15 and to the first load, preferably at point 59, by a control element in the form of a unidirectional conductor such as a crystal diode 60. Resistors 61, 62 serve as plate load resistors for the tubes 16, 17 respectively with the cathodes connected together and to circuit ground through a resistor 63. The plate signal from the tube 16 is connected to the control grid of the tube 18 of the regulator unit through a coupling resistor 65. A control element in the form of a unidirectional conductor such as a crystal diode 66, is connected from the plate of the tube 16 to the cathode of the tube 18.

In actual operation, the above described regulated power supply achieves its primary objectives as follows:

The vacuum triode tube 40 is connected to provide a substantially constant current to the screen grids of the amplifier tubes 31, 32. When the hydrogen gas discharge lamp 20, one of the loads on the circuit, fails to fire either through a malfunction in the circuit such as a failure of the square wave oscillator 33 or a direct malfunction of the lamp itself, the diode 48 connected to the grid of the tube 40 conducts and lowers the grid potential toward circuit ground. This change interrupts the constant current supply to the screen grids of the tubes 31, 32 and precludes their developing an overload current.

During the instantaneous turn-on of the hydrogen lamp 20 by the actuation of the switch 24, the diode 60 conducts and thereby shuts off the tube 16. The shutting off effect on the amplifier tubes 16, 17 turns the regulator tube 18 fully on, thus raising the voltage on the line 11 so as to provide a greater firing voltage to the hydrogen gas discharge lamp.

During the instantaneous firing of the hydrogen lamp, diode 66 prevents the grid of the regulator tube 18 from becoming positive and thereby drawing an excessive grid current during the high voltage operation.

After the turn-on of the hydrogen lamp has raised the effective firing voltage of such lamp, both the diode 66 and the diode 60 become reverse biased. Thus, the tubes resume their normal biasing voltages and the entire circuit reverts to its normal regulation scheme.

The circuit as described above provides for improved operation of regulated power supplies by protecting the system against overloads, protecting the regulator or current control tubes against damage due to grid current during out-of-regulation operation, and by incorporating inexpensive constant current supplies in conjunction with the constant voltage supply and by providing booster voltages for firing loads such as gas discharge lamps. It should be noted that not only does the cathode follower circuit utilizing the tube 40 provide a constant current and protection against overload, it is also less expensive than the conventional bleeder resistors utilized in prior art circuits.

Although an exemplary embodiment of the invention has been disclosed and discussed, it will be understood that other applications of the invention are possible and that the embodiment disclosed may be subjected to various changes, modifications and substitutions without departing from the spirit of the invention.

We claim as our invention:

1. In a regulated power supply, the combination of:
   an unregulated power source;
   an amplifier unit;
   a regulator unit;
   first and second loads;
   circuit means interconnecting said power source, said amplifier unit and said regulator unit to provide a regulated D.C. output voltage across said first and second loads;
   a control means for supplying a substantially constant current to said second load from said regulated output voltage; and
   a control circuit connected between said first load and said control means providing a means for interrupting the current supply from said control means to said second load in the event an open circuit condition occurs in said first load.

2. In a regulated spectrophotometer power supply, the combination of:
   an unregulated power source;
   an amplifier unit;
   a regulator unit;
   a first load including a lamp adapted for use in a spectrophotometer;
   a second load including means for providing an ultimate A.C. to said spectrophotometer;
   circuit means interconnecting said power source, said amplifier unit and said regulator unit to provide a regulated D.C. voltage across said first and second loads;
   a control means for supplying a substantially constant current to said second load from said regulated D.C. voltage; and
   a control circuit connected between said control means and said first load and including unidirectional conducting means for interrupting the D.C. current supply from said control means to said second load in the event of failure of said lamp.

3. In a regulated spectrophotometer power supply, the combination of:
   an unregulated power source;
   a first amplifier unit;
   a regulator unit;
   a first load including a lamp adapted for use in a spectrophotometer;
   a second load including a second amplifier unit having a current control means, driving oscillator means, and an output transformer;
   circuit means interconnecting said power source, said first amplifier unit, and said regulator unit to provide a regulated voltage across said first and second loads; and
   a control circuit energized from said regulated voltage and including a control element having a positive electrode, a negative electrode, and a control electrode, a plurality of resistors connected between the negative electrode thereof and a reference point of said second amplifier unit, a pair of resistors connected between said regulated voltage and said reference point with the junction of said pair connected to said control electrode, and a diode connected between said control electrode and said first load for current conduction to circuit ground and interruption at the current supply to said reference point in the event of failure of said lamp.

4. In a regulated spectrophotometer power supply, the combination of:
   an unregulated power source;
   an amplifier unit;
   a regulator unit;

a first load including a lamp adapted for use in a spectrophotometer;
means for turning said lamp on and off;
a second load including means for providing an ultimate regulated A.C. output to said spectrophotometer;
circuit means interconnecting said power source, said amplifier unit, and said regulator unit to provide a regulated voltage at the output of said regulator unit for said first and second loads; and
a control circuit connected between said first load and said amplifier unit providing a circuit means connecting said lamp to said amplifier unit for unidirectional conduction for raising the instantaneous voltage output of said regulator unit at the moment of firing said lamp.

5. In a regulated spectrophotometer power supply, the combination of:
an unregulated power source;
a phase inverter unit;
an amplifier unit including a pair of amplifier means connected in parallel and each having a positive electrode, a negative electrode, and a control electrode;
a regulator unit;
a first load including a lamp adapted for use in a spectrophotometer;
means for turning said lamp on and off;
a second load including means for providing an ultimate regulated A.C. output to said spectrophotometer;
circuit means interconnecting said power source, said phase inverter, said amplifier unit, and said regulator unit to provide a regulated D.C. voltage across said first and second loads with said phase inverter output driving one of said control electrodes; and
a control circuit connected between said first load and said amplifier unit providing a circuit means connecting said lamp to the other of said control electrodes, including a diode connected in series for interrupting the effect of said amplifier means and for raising the instantaneous voltage output of said regulator unit at the moment of firing said lamp.

6. A regulated spectrophotometer power supply as set forth in claim 5, in which said second load includes a pair of power amplifier tetrodes connected in parallel, an oscillator means for driving the control grids of said tetrodes, and an output transformer conected to the plates of said tetrodes, and in which said control circuit also includes a triode, a plurality of resistors connected between the cathode thereof and the screen grids of said tetrodes, a voltage divider connected between the regulated D.C. voltage and said screen grids with a divider tap connected to the triode control element, and a diode connected between said triode control element and said first load.

7. A regulated spectrophotometer power supply as set forth in claim 5, including means connecting said amplifier unit to said regulator unit including a unidirectional circuit element for preventing said regulator unit from drawing excessive current during the firing of said lamp.

8. In a regulated spectrophotometer power supply, the combination of:
an unregulated power source;
a phase inverter unit;
an amplifier unit;
a regulator unit;
a first load including a lamp adapted for use in a spectrophotometer;
means for turning said lamp on and off;
a second load including means for providing an ultimate regulated A.C. output to said spectrophotometer;
circuit means interconnecting said power source, said phase inverter, said amplifier unit, and said regulator unit to provide a regulated D.C. voltage across said first and second loads; and
a control circuit connected between said first and second loads, said amplifier unit, and said regulator unit providing first circuit means connecting said lamps to said amplifier unit including means for interrupting the effect of said amplifier unit and for raising the instantaneous voltage through said regulator unit at the moment of firing said lamp, second circuit means connecting said amplifier unit to said regulator unit including a diode for preventing said regulator unit from drawing an excessive current during the firing of said lamp, and third circuit means connecting said second load to said regulator unit including a control means for the second load having a control element therewithin, and a diode connected to the control element and said first load.

9. In a regulated spectrophotometer power supply, the combination of:
an unregulated power source;
a phase inverter unit;
an amplifier unit including a pair of vacuum triode tubes connected in parallel;
a regulator unit including at least one vacuum triode regulator tube;
a first load including a lamp adapted for use in a spectrophotometer;
means for turning said lamp on and off;
a second load including a pair of power amplifier tetrodes connected in parallel, an oscillator means provided to drive the control grids of said tetrodes, and an output transformer connected to the plate of said tetrodes;
circuit means interconnecting said power source, said phase inverter, said amplifier unit, and said regulator unit to provide a regulated D.C. voltage across said first and second loads; and
a control circuit connected between said first and second loads, said amplifier unit, and said regulator unit providing first circuit means connecting said light source lamp to the grid of one of said triode tubes comprising said amplifier unit including a diode for interrupting the effect of said amplifier unit and for raising the instantaneous voltage through said regulator unit at the moment of firing said lamp, second circuit means connecting said amplifier unit to the grid of said regulator tube including a diode for preventing the grid thereof from drawing excessive grid current during the firing of said lamp, and third circuit means connecting said second load to said regulator unit including a vacuum triode, a plurality of resistors connected between the cathode thereof and the screen grids of said tetrodes, a resistor connected between the grid of said triode and the screen grids of said tetrodes, and a diode connected to the grid of said triode and going to circuit ground.

10. In a regulated spectrophotometer power supply, the combination of:
an unregulated power source;
a phase inverter;
an amplifier unit including a pair of vacuum triode tubes connected in parallel;
a regulator unit including at least one vacuum triode regulator tube;
a first load including a gas discharge lamp adapted for use in a spectrophotometer;
means for turning said lamp on and off;
a second load including a means for providing an ultimate regulated A.C. output to said spectrophotometer;
circuit means interconnecting said power source, said phase inverter, said amplifier unit, and said regulator unit to provide a regulated D.C. voltage across said first and second loads; and a control circuit connected between said gas discharge lamp, said amplifier unit, and said regulator unit providing first circuit means connecting said gas discharge lamp and the grid of one of said triode tubes comprising said amplifier unit including a diode for shutting off the effect of said amplifier tubes and raising the instantaneous voltage through said regulator unit at lamp turn-on, and second circuit means connecting said amplifier unit to the grid of said regulator tube including a diode for preventing the grid thereof from drawing excessive grid current during said firing of said lamp.

11. In a regulated spectrophotometer power supply, the combination of:
- an unregulated power source;
- an amplifier unit;
- a regulator unit;
- a first load including a lamp adapted for use in a spectrophotometer;
- means for turning said lamp on and off;
- a second load including means for providing an ultimate regulated A.C. output to said spectrophotometer;
- circuit means interconnecting said power source, said amplifier unit, and said regulator unit to provide a regulated D.C. output voltage at the output of said regulator unit for said first and second loads;
- a control means for supplying a substantially constant current to said second load from said regulated output voltage; and
- a control circuit means including a first circuit means connecting said lamp to said amplifier unit for unidirectional conduction for raising the instantaneous voltage output of said regulator unit at the moment of firing said lamp and a second circuit means connecting said lamp and said control means for interrupting the current supply from said control means to said second load in the event an open circuit condition occurs in said first load.

12. In a regulated spectrophotometer power supply, the combination of:
- an unregulated power source;
- an amplifier unit;
- a regulator unit;
- a load for providing an ultimate regulated A.C. output to said spectrophotometer including a pair of power amplifier tetrodes connected in parallel, an oscillator means for driving the control grids of said tetrodes, and an output transformer connected to the plates of said tetrodes;
- circuit means interconnecting said power source, said amplifier unit, and said regulator unit to provide a regulated D.C. voltage across said load; and
- a control circuit energized from said regulated voltage and including a cathode follower connected between said regulated voltage and the screen grids of said tetrodes and having a control grid coupled to a reference voltage source.

References Cited by the Examiner
UNITED STATES PATENTS

| | | | |
|---|---|---|---|
| 934,997 | 9/1909 | Creveling | 315—297 |
| 2,985,813 | 5/1961 | Garfinkel | 323—22 |

JOHN W. HUCKERT, *Primary Examiner.*

JAMES D. KALLAM, *Examiner.*